(12) United States Patent
Dewan et al.

(10) Patent No.: US 10,810,327 B2
(45) Date of Patent: Oct. 20, 2020

(54) ENFORCING SECURE DISPLAY VIEW FOR TRUSTED TRANSACTIONS

(71) Applicant: Intel Corporation, Santa Clara, CA (US)

(72) Inventors: Prashant Dewan, Portland, OR (US); Siddhartha Chhabra, Portland, OR (US); Uttam K. Sengupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 15/863,593

(22) Filed: Jan. 5, 2018

(65) Prior Publication Data

US 2019/0042804 A1 Feb. 7, 2019

(51) Int. Cl.
| | | |
|---|---|---|
| *G06F 21/84* | (2013.01) | |
| *G06F 21/53* | (2013.01) | |
| *G06F 21/60* | (2013.01) | |
| *G09G 5/14* | (2006.01) | |
| *G09G 5/38* | (2006.01) | |

(Continued)

(52) U.S. Cl.
CPC .............. *G06F 21/84* (2013.01); *G06F 21/53* (2013.01); *G06F 21/57* (2013.01); *G06F 21/602* (2013.01); *G09G 5/003* (2013.01); *G09G 5/006* (2013.01); *G09G 5/14* (2013.01); *G09G 5/38* (2013.01); *G09G 5/395* (2013.01); *G06F 2221/031* (2013.01); *G06F 2221/2149* (2013.01); *G09G 2340/0485* (2013.01); *G09G 2358/00* (2013.01); *G09G 2370/042* (2013.01); *G09G 2370/047* (2013.01)

(58) Field of Classification Search
CPC .......... G06F 21/84; G06F 21/53; G06F 21/57; G06F 21/602; G06F 2221/031; G06F 2221/2149; G09G 5/003; G09G 5/006; G09G 5/14; G09G 5/38; G09G 5/395; G09G 2340/0485; G09G 2358/00; G09G 2370/042; G09G 2370/047
USPC ....................................................... 713/190
See application file for complete search history.

(56) References Cited

U.S. PATENT DOCUMENTS

| | | | | |
|---|---|---|---|---|
| 4,688,167 A | * | 8/1987 | Agarwal | G09G 5/14 |
| | | | | 345/629 |
| 5,574,836 A | * | 11/1996 | Broemmelsiek | G06F 3/012 |
| | | | | 345/427 |

(Continued)

*Primary Examiner* — Shahriar Zarrineh
(74) *Attorney, Agent, or Firm* — Schwabe, Williamson & Wyatt, P.C.

(57) ABSTRACT

In embodiments, an apparatus to enforce secure display view for trusted transactions may include a first input interface to receive from an application, via a trusted execution environment (TEE), viewport size data and an identifier of a display associated with a secure display of a trusted transaction; and a second input interface to receive from the application, via an untrusted execution environment, an encrypted transaction bitmap associated with the trusted transaction, to be securely displayed on the display; and an enforcement engine coupled to the first input interface and the second input interface, to verify that the size and location of the transaction bitmap are within the viewport to ensure the secure display of the transaction bitmap. In embodiments, after verification of the size and location of the transaction bitmap being within the viewport, the transaction bitmap may be displayed.

25 Claims, 8 Drawing Sheets

(51) Int. Cl.
*G09G 5/395* (2006.01)
*G09G 5/00* (2006.01)
*G06F 21/57* (2013.01)

(56) References Cited

U.S. PATENT DOCUMENTS

| | | | | |
|---|---|---|---|---|
| 5,812,138 | A * | 9/1998 | Devic | G06T 17/00 345/419 |
| 5,831,614 | A * | 11/1998 | Tognazzini | G06F 3/033 715/784 |
| 5,880,733 | A * | 3/1999 | Horvitz | G06F 3/04815 715/850 |
| 6,285,363 | B1 * | 9/2001 | Mairs | G06F 3/1462 715/751 |
| 6,836,548 | B1 * | 12/2004 | Anderson | G06F 21/72 380/255 |
| 6,864,899 | B1 * | 3/2005 | Barrus | G09G 5/393 345/530 |
| 6,918,039 | B1 * | 7/2005 | Hind | G06F 21/6218 713/176 |
| 7,039,801 | B2 * | 5/2006 | Narin | G06F 21/53 713/152 |
| 7,051,040 | B2 * | 5/2006 | Easwar | G06F 16/9577 |
| 7,159,112 | B1 * | 1/2007 | Williams | G06F 21/84 380/54 |
| 8,448,251 | B2 * | 5/2013 | Harris | G06F 21/74 726/26 |
| 9,118,902 | B1 * | 8/2015 | Conran | H04N 13/261 |
| 9,786,205 | B2 * | 10/2017 | Dewan | G09C 5/00 |
| 9,799,093 | B2 * | 10/2017 | Chhabra | G06T 1/60 |
| 9,849,384 | B1 * | 12/2017 | Energin | A63F 13/5252 |
| 9,953,009 | B1 * | 4/2018 | Behar | G06F 17/212 |
| 10,331,862 | B2 * | 6/2019 | Glazner | H04L 9/14 |
| 2002/0175923 | A1 * | 11/2002 | Lin | G06T 15/40 345/629 |
| 2004/0064498 | A1 * | 4/2004 | Imanishi | A63F 13/12 709/201 |
| 2004/0110490 | A1 * | 6/2004 | Steele | H04L 29/06 455/412.1 |
| 2005/0212806 | A1 * | 9/2005 | Koselj | G06T 1/20 345/522 |
| 2005/0262568 | A1 * | 11/2005 | Hansen | G06F 21/6218 726/26 |
| 2006/0010134 | A1 * | 1/2006 | Davis | H04L 63/104 |
| 2006/0137008 | A1 * | 6/2006 | Maor | G06F 21/57 726/22 |
| 2007/0070088 | A1 * | 3/2007 | Oishi | G06T 15/005 345/629 |
| 2008/0077880 | A1 * | 3/2008 | Oygard | G06F 3/0485 715/799 |
| 2008/0291201 | A1 * | 11/2008 | Lafon | G06T 15/205 345/427 |
| 2008/0291217 | A1 * | 11/2008 | Vincent | G06T 17/05 345/629 |
| 2008/0292213 | A1 * | 11/2008 | Chau | G06F 16/58 382/294 |
| 2009/0102837 | A1 * | 4/2009 | Kang | G06T 15/503 345/419 |
| 2009/0168085 | A1 * | 7/2009 | Suzuki | G06K 15/02 358/1.9 |
| 2010/0186078 | A1 * | 7/2010 | Napoli | H04L 9/0897 726/9 |
| 2010/0241694 | A1 * | 9/2010 | Jensen | H04L 69/24 709/203 |
| 2011/0199308 | A1 * | 8/2011 | Nativel | G06F 21/606 345/168 |
| 2012/0047506 | A1 * | 2/2012 | Maes | G06F 9/541 718/100 |
| 2012/0113103 | A1 * | 5/2012 | Kim | G06F 9/54 345/419 |
| 2012/0331550 | A1 * | 12/2012 | Raj | G06F 21/575 726/22 |
| 2013/0014039 | A1 * | 1/2013 | Lachenmann | G06F 8/38 715/765 |
| 2013/0067228 | A1 * | 3/2013 | Dewan | H04L 9/0825 713/171 |
| 2013/0305388 | A1 * | 11/2013 | Kottilingal | G06F 21/6218 726/28 |
| 2014/0006800 | A1 * | 1/2014 | Bickford | H04W 12/06 713/189 |
| 2014/0115330 | A1 * | 4/2014 | Chen | H04L 63/18 713/166 |
| 2014/0289807 | A1 * | 9/2014 | Collado | G06F 21/53 726/4 |
| 2014/0344960 | A1 * | 11/2014 | Adams | G06F 21/86 726/34 |
| 2015/0086012 | A1 * | 3/2015 | Chhabra | H04N 21/4122 380/200 |
| 2015/0116468 | A1 * | 4/2015 | Au | G09G 3/003 348/54 |
| 2015/0161579 | A1 * | 6/2015 | Madden | G06F 21/606 705/18 |
| 2015/0180657 | A1 * | 6/2015 | Dewan | G09C 5/00 380/30 |
| 2017/0039396 | A1 * | 2/2017 | Sharp | G06F 12/1458 |
| 2017/0228536 | A1 * | 8/2017 | Malhotra | G06F 21/53 |
| 2018/0121681 | A1 * | 5/2018 | Huang | G06F 21/83 |
| 2019/0043153 | A1 * | 2/2019 | Nadampalli | G06F 9/544 |
| 2019/0103074 | A1 * | 4/2019 | Chhabra | H04L 9/088 |
| 2019/0121498 | A1 * | 4/2019 | Jakobovits | G06F 3/1431 |
| 2020/0065052 | A1 * | 2/2020 | Lewbel | G06F 3/04845 |

* cited by examiner

ENFORCING SECURE DISPLAY VIEW FOR TRUSTED TRANSACTIONS

FIELD

The present invention relates to the field of computing, and in particular to computing security associated with enforcing secure display view for trusted transactions.

BACKGROUND

Both the Fast Identity Online (FIDO) Alliance and Global Platform® mandate secure transaction output for certification at higher security levels. In general, secure transaction outputs need to support two types of transactions. A first type may be a confirmation transaction, where a user is shown a transaction screen and the user is expected to acknowledge the transaction before the transaction is actually committed. A second type may be a secure transaction for collection of user data, where a user is shown an input window and is expected to enter the details of the transaction. Once the user has entered the details of the transaction, the system displays to the user a transaction confirmation screen. Once the user clicks on, or otherwise signals an acknowledgment, the transaction may be committed, e.g., in a cloud database.

DETAILED DESCRIPTION

Figure 1A:
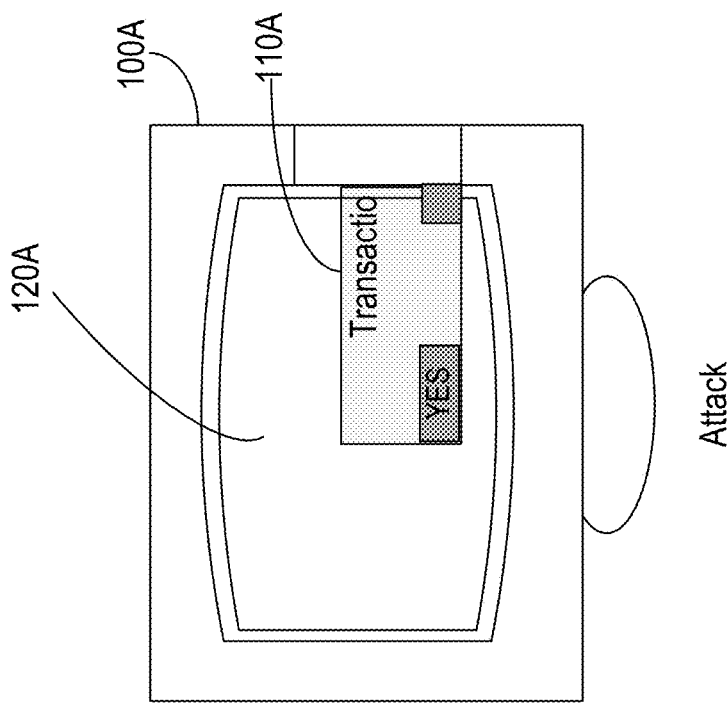
FIG. 1A illustrates the example transaction bitmap of FIG. 1, displayed on the example display in a manner not wholly within the example viewport, as a result of an attack.

In embodiments, an apparatus to enforce secure display view for trusted transactions, may include a first input interface to receive from an application, via a trusted execution environment (TEE), viewport size data and an identifier of a display associated with a secure display of a trusted transaction. The apparatus may further include a second input interface to receive from the application, via an untrusted execution environment, an encrypted transaction bitmap associated with the trusted transaction, to be securely displayed on the display. Finally, the apparatus may include an enforcement engine coupled to the first input interface and the second input interface, to verify that the size and location of the transaction bitmap are within the viewport to ensure the secure display of the transaction bitmap. In embodiments, after verification of the size and location of the transaction bitmap being within the viewport, the transaction bitmap may be displayed.

In embodiments, to verify the size and location of the transaction bitmap are within the viewport to ensure the secure display of the transaction bitmap, the enforcement engine may decrypt the transaction bitmap, and determine whether the size and location of the transaction bitmap are within the viewport. In embodiments, the enforcement engine, in response to a determination that the size and location of the transaction bitmap are within the viewport, may further re-encrypt the transaction bitmap and send the encrypted transaction bitmap to the display.

In embodiments, the trusted execution environment may be associated with a processor that operates the application, and the first input interface may be a secure interface that is only accessible to the trusted execution environment of the processor. In embodiments, the untrusted execution environment may be associated with a processor that operates the application, and the second input interface may be a non-secure interface that is accessible to the untrusted execution environment of the processor.

In embodiments, the transaction bitmap may include a header that includes its (X,Y) co-ordinates, its size, and the identification of the display, and, in embodiments, to verify that the size and location of the secure bitmap are within the viewport may include comparing a rectangle formed by the bitmap with the viewport. In embodiments, the enforcement engine may compare the rectangle formed by the bitmap with the viewport using, at least in part, Painter's algorithm.

Moreover, in embodiments, the enforcement engine, in response to a failure to verify that the size and location of the transaction bitmap are within the viewport, may: readjust the bitmap's (X,Y) co-ordinates to move the bitmap to the center of the viewport; encrypt the readjusted bitmap; and generate an interrupt for a processor coupled to the apparatus that sent the encrypted transaction bitmap, the interrupt to indicate that the transaction bitmap was edited, and send the interrupt to the processor.

In alternate embodiments, the enforcement engine, in response to a determination that the size and location of the transaction bitmap are within the viewport, may re-encrypt the transaction bitmap and write the encrypted transaction bitmap to a memory. Then, in embodiments, the encrypted transaction bitmap in the memory may be read by a processor coupled to an apparatus that sent the encrypted transaction bitmap (via the untrusted execution environment). In embodiments, the encrypted transaction bitmap in the memory may be further decrypted by the processor and sent to the display.

Finally, in embodiments, the encrypted transaction bitmap written to the memory may include a display identifier to be read by the processor, and to then be further encrypted by the processor with a display key, and then sent, by the processor, with the transaction bitmap to the display.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network.

Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the terms "module", "CPU", "input interface", "trusted interface", "untrusted interface, "trusted environment", "untrusted environment", "enforcement engine", "display controller", and "graphics controller" or "graphics engine", may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

Figure 1:
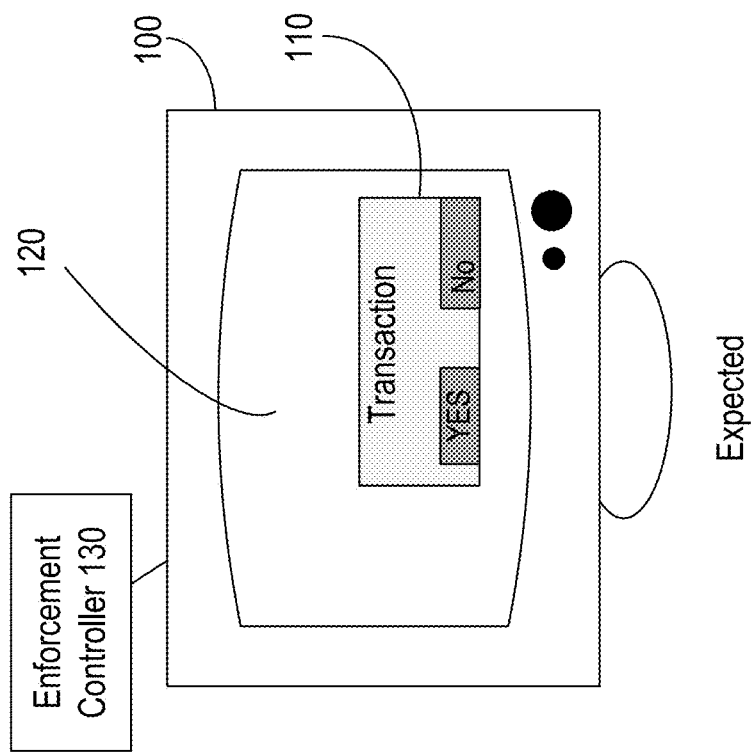
FIG. 1 illustrates an example transaction bitmap displayed on a display within an example viewport, as expected, in accordance with various embodiments.

FIG. 1 illustrates an example transaction bitmap 110 displayed on a display 100 within an example viewport 120, as expected, in accordance with various embodiments. With reference thereto secure transaction bitmap 110 is displayed wholly within viewport 120 of the display 100. It is important that the secure bitmap be properly displayed, because, as in this example, it may offer a user two choices, for example, as here, "Yes" and "No." In embodiments, an enforcement controller 130 may be configured to ensure that secure transaction bitmap 110 is displayed wholly within viewport 120 of the display 100, to be described more fully below.

FIG. 1A illustrates the example transaction bitmap of FIG. 1, displayed on an identical example display in a manner not wholly within the example viewport, as a result of an attack, without the protection offered by enforcement engine 130. Here secure transaction bitmap 110A is displayed only within a portion of viewport 120A of display 100A. Thus, due to the obscuring of the right portion of the secure transaction bitmap, a user may only see one choice, that of "Yes" and may be induced to buy something, or authorize some download, or other action, that he or she really should not.

In connection with the potential problem illustrated in FIGS. 1 and 1A, it is noted that one approach to enforcing secure transactions involves using a combination of encrypted images being decrypted by a display controller, or an overlay screen that is overlaid on top of all other windows. However, in such solutions, the coordinates of a secure transaction output window and the coordinates of the display panel viewport are controlled by an untrusted OS stack. Thus, using this approach, a trusted application cannot verify if the bitmap sent by the application was actually displayed on a user's display, as expected, such as shown in the example of FIG. 1. If an attacker were to change the (X, Y) coordinates of the bitmap, the bitmap may be partially displayed, as shown in the example of FIG. 1A, or even not displayed at all (not shown), forcing the user to make a wrong choice. It is noted that the reason the (X, Y) coordinates are controlled by an untrusted windows manager in such solutions is so as to provide the user with the freedom to move the window around.

In various embodiments, a display controller may be configured with enforcement engine 130 to enforce a secure transaction bitmap being completely displayed within the viewport of a display, and thus, that none of it is displayed outside a user's viewable region. Moreover, before displaying the secure transaction bitmap, an example system may securely assign identification numbers to multiple connected display panels to insure that the correct panel or display receives the transaction bitmap, thereby preventing malware or other attackers from routing the transaction bitmap to the wrong display. In addition, in embodiments, a secure module, for example, a secure portion of Application 210 of FIG. 2, or Application 310 of FIG. 3, running inside a TEE 220 or 320, may be provided to cooperate with enforcement engine 130 to ensure that a secure transaction bitmap is actually displayed on the screen that the user intended it to be displayed on. It is noted that a secure module may, in embodiments, include a secure portion of an application not accessible to the rest of the application, or alternatively, in embodiments, a helper application totally running in a secure world, such as, for example, an application running inside a secure VM and assisting an unsecure application.

It is noted that in what follows, a secure transaction bitmap may simply be referred to as a "transaction bitmap" and, in context, simply a "bitmap."

In embodiments, a "secure flag" may be encoded in the bitmap and may convey the assigned display number of the display or panel, as well as the display's viewport coordinates (X,Y) to a display controller or graphics controller (the latter, if the composition of the display is done in a graphics controller). In embodiments, these controllers may use Painter's algorithm to ascertain that the secure bitmap is within the viewport. Thus, if an attacker tries to move the secure bitmap outside the viewport, in embodiments, the bitmap may be moved to the center of the display by, for example, the display controller, and an interrupt may be sent to the secure application that the bitmap was repositioned on the screen, in order to make it visible to the user, thereby remediating the malware and thwarting the attack.

In some embodiments, viewport coordinates may be obtained from an Extended Display Identification Data ("EDID") sent by a panel. It is here noted that an EDID is a data structure provided by a digital display to describe its capabilities to a video source. An EDID allows a computing platform to know what kinds of monitors are connected to it. In embodiments, a connected or coupled panel may be considered as trusted; thus an EDID received through the display port may also be considered trusted. However, on some platforms with older panels, untrusted software may overwrite the EDID received from the panel. This may be done, for example, when the panel's ROM has the wrong EDID.

It is here further noted that in some cases a bitmap may not be displayable on some panels due to the size of the panel or a lack of High-bandwidth Digital Content Protection (HDCP) 2.2 support or lack of HDCP 2.2 integrity support (described below) in the panel. In such cases, in embodiments, a display controller may drop the bitmap and send an interrupt to the secure module that it has dropped the frame.

It is assumed in what follows that a secure application may encrypt, and integrity may protect a frame, and that a display controller or graphics controller may decrypt the frame and verify the integrity. It is further assumed that an intermediate software stack is untrusted and should only handle encrypted frames, so that it does not have access to the contents of the frame.

As noted above, in embodiments, a display controller may include an additional hardware block, named an enforcement engine. In some embodiments, a display may send EDID information to the display controller. The display controller may extract the coordinates of the viewport from the EDID information, such as, for example, bytes 21, 22 in EDID 1.3. The enforcement engine may then validate the coordinates of the secure bitmap against the viewport data extracted from EDID headers.

However, in certain cases, software may need to override the EDID information chosen by the display controller. It is here noted that the EDID information is generally embedded in a ROM inside a display monitor. However, many times the ROM may have a bug, or the information may become stale based on the operating system running on a host PC. In such cases, the device driver may need to override this information. In such cases, untrusted software may write the viewport coordinates into display controller registers. In these cases, in embodiments, the enforcement engine may use the untrusted value (as long as the panel connected to the display supports it). However, during a trusted transaction bitmap display, the enforcement engine may lock the viewport co-ordinates, as received from the EDID, so that untrusted software cannot modify them. Subsequently, when the trusted transaction display is over, the enforcement engine may unlock the viewport co-ordinates. Thus, in the example systems of FIGS. 2 and 3, the secure application running in the TEE may obtain the viewport information from the display controller. More specifically, it may obtain the viewport information from the enforcement engine in the display controller, and the display controller/enforcement engine may receive this information from the display through the EDID.

Figure 2:
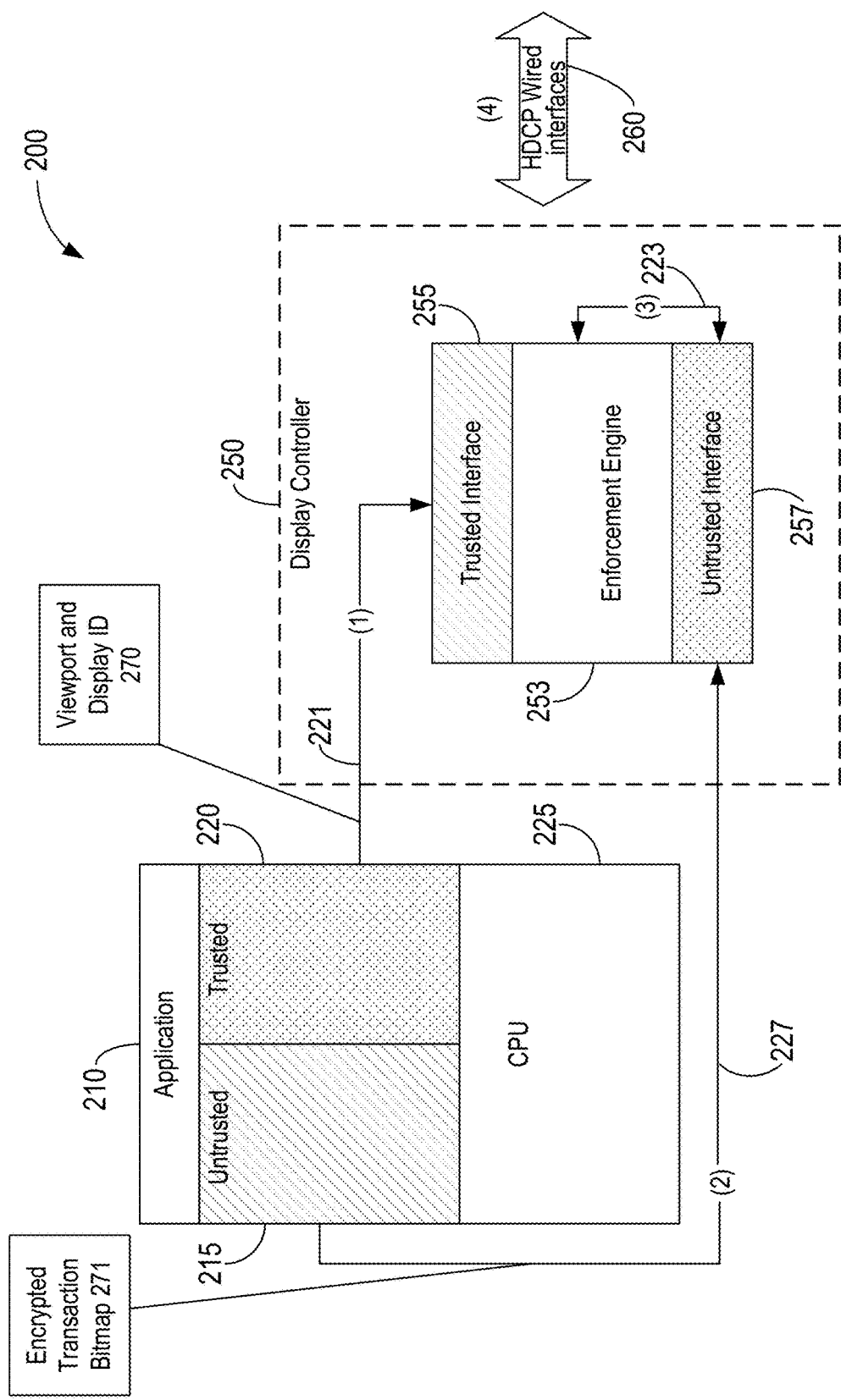
FIG. 2 illustrates an example system where a display controller sends a bitmap directly to a display device, in accordance with various embodiments.

In some embodiments, an example apparatus may be provided in a display controller. FIG. 2 illustrates an example system 200 for enforcement of secure display view of bitmaps when a desktop is composed by a display controller. With reference thereto, Enforcement Engine 253 may be provided in Display Controller 250. Enforcement Engine 253 may be enforcement engine 130 of FIG. 1. Enforcement Engine 253 may be provided with two input interfaces, Trusted Interface 255 and Untrusted Interface 257. Application 210 may be running on CPU 225, which may have a portion that executes within Trusted Execution Environment (TEE) 220, and another portion that executes within an Untrusted Execution Environment (UEE) 215. In embodiments, only TEE 220 may access Trusted Interface 255 of Enforcement Engine 253, while UEE 215 may access Untrusted Interface 257 of Enforcement Engine 253.

TEE 220 may include various TEEs available, such as, for example, secure virtual machine (VM), System Management Mode (SMM), Software Guarded Extension (SGX), TrustZone, etc. As noted, secure portion of application 210 may run inside TEE 220. In embodiments, it may use Trusted Interface 255 to program a decryption key, viewport coordinates and a display ID number (described in further detail below, in connection with FIG. 4) into Enforcement Engine 253. Once Enforcement Engine 253 receives the viewport and display ID number 270, it may then evaluate any frames against the viewport and display ID number. Continuing with reference to FIG. 2, secure portion of application 210 may encrypt a transaction bitmap 271 and send it to Enforcement Engine 253 along communications link 227, through Untrusted Interface 257. In embodiments, UEE 215 may add a header to transaction bitmap 271 that includes (X, Y) co-ordinates of the bitmap, its size, and a display ID number for an intended display.

In embodiments, once Enforcement Engine 253 receives the encrypted transaction bitmap 271 it may decrypt the transaction bitmap and compare the rectangle formed by the bitmap with the viewport bitmap using, for example, at least in part, Painter's algorithm. In embodiments, if any part of the rectangle of the transaction bitmap is outside the viewport, Enforcement Engine 253 may readjust the bitmap's (X, Y) coordinates to push the bitmap to the center of the viewport and generate and send an interrupt to CPU 225. However, if it determines that the bitmap is within the viewport, then Enforcement Engine 253 may compose the bitmap with the rest of the desktop.

In embodiments, Enforcement Engine 253 may encrypt the composed desktop with an appropriate digital copy protection key for the right display, and send it to the display panel. Finally, Enforcement Engine 253 may write a keyed-hash message authentication code (HMAC) of the bitmap and a shared key to a host readable register, and send an interrupt to CPU 225 confirming that the bitmap was displayed to the user. In embodiments, secure application 210 may read and verify the HMAC, and thereby be assured that the bitmap was actually displayed to the user as intended.

To summarize, with reference to FIG. 2, in embodiments, the following process flow may occur, as shown: (1) Secure portion of Application 210 running on CPU 325 sends viewport and display ID number from within TEE 220 of CPU 225 to Enforcement Engine 253 over path 221 via Trusted Interface 255 of Enforcement Engine 253; (2) Unsecure Application 210 sends an encrypted bitmap to Enforcement Engine 253 from within UEE 215 of CPU 225, over an untrusted channel 227 via Untrusted Interface 257 of Enforcement Engine 253; (3) Enforcement Engine 253 verifies, as shown at 223, that the bitmap received in (2) above is inside the viewport; (4) Enforcement Engine 253 encrypts the bitmap and sends it out via HDCP Wired Interfaces 260 to the display designated by the display ID number received in (1).

It is here noted, as regards integrity using HDCP 2.2, the current version of HDCP 2.2 only supports Advanced Encryption Standard (AES)-counter mode and does not support any integrity based cipher mode such as, for example, AES-Gaolis Counter Mode (GCM). However, HDCP 2.2 has been made extensible to support modes such as AES-GCM. In such modes a content receiver may send a list of supported modes in 4 bits and a sender may choose an encryption mode on a per-frame basis, if needed. In embodiments, this capability may be used to add AES-GCM for secure transaction frames.

Figure 3:
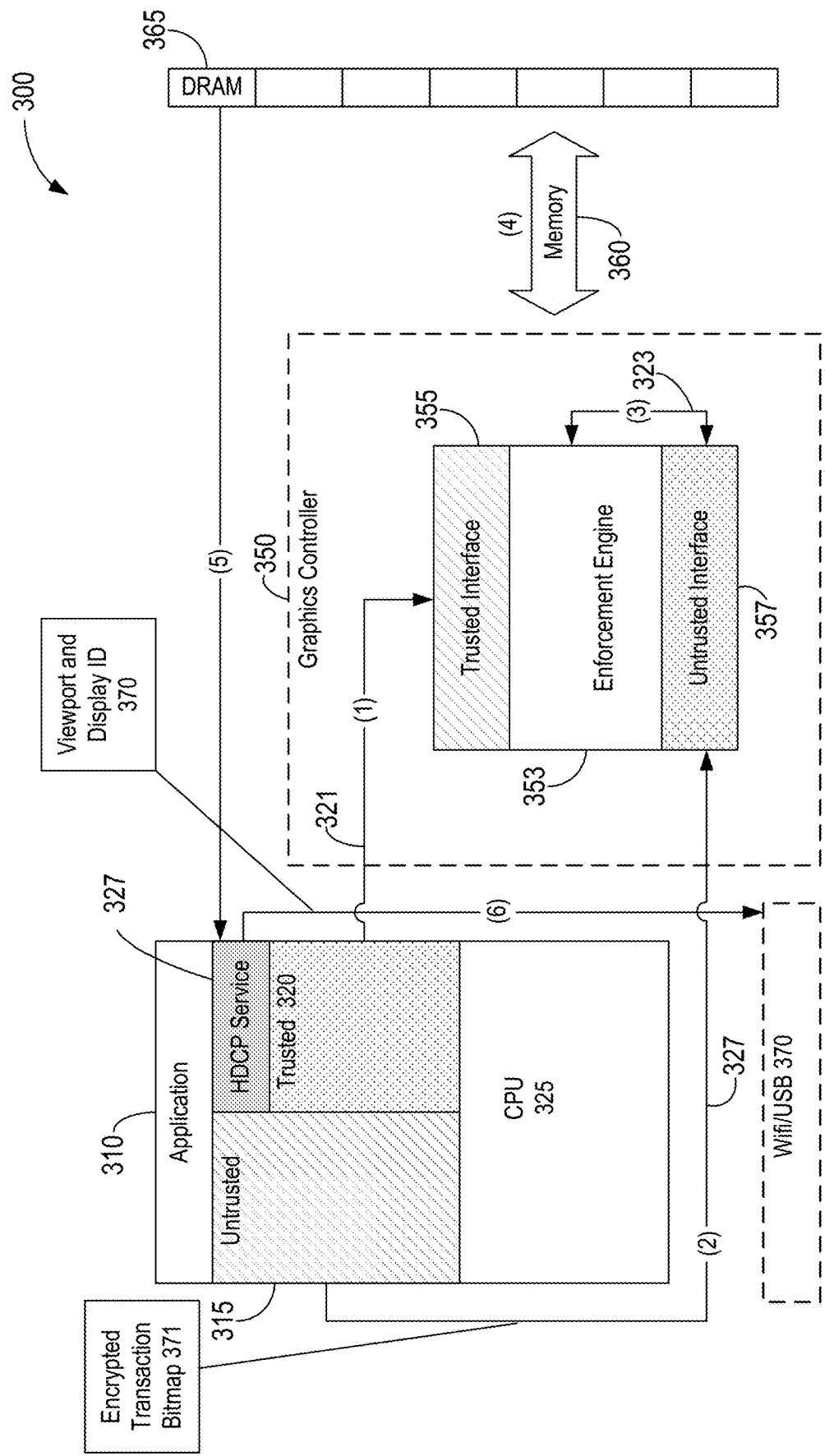
FIG. 3 illustrates an alternate example system, where a display controller writes a bitmap to memory, in accordance with various embodiments.

FIG. 3 illustrates an alternate example system 300, where a display controller may, following verification as described above, write a transaction bitmap to memory, in accordance with various alternate embodiments. Such alternate embodiments involve enforcement of the secure display view of secured bitmaps when a desktop is composed by graphics engines, as opposed to display controllers, as shown, for example, in FIG. 2, and described above.

Thus, in certain cases for both wired and wireless interfaces, composition of a secure bitmap and desktop may be performed by graphics engines. To address such cases, in alternate embodiments, the enforcement engine may be provided in, or be part of, a graphics controller for wired interfaces. Such an enforcement engine is the same as Enforcement Engine 253 explained with reference to FIG. 2, and may be configured by the TEE in the same manner as explained above, with reference to FIG. 2.

Thus, in example system 300 as shown in FIG. 3, analogous elements to those elements shown in FIG. 2, which share the same final two digits of their respective index numbers, need not be described again. Rather, only the differences between example systems 200 and 300 will be noted.

With reference to FIG. 3, instead of an enforcement engine, following verification that it fits within a viewport of an intended display, sending the encrypted transaction bitmap out for display, in system 300 Enforcement Engine 353 (which may be enforcement engine 130) may write the encrypted transaction bitmap to memory. This is because graphics engines read bitmaps from memory and write them back to memory. Thus, in embodiments, once an enforcement engine in a graphics engine receives the encrypted bitmap 371, as described above, it may decrypt the bitmap, and compare the rectangle formed by the bitmap with the viewport bitmap using, at least in part, Painter's algorithm. If any part of the rectangle is outside the viewport, as above, Enforcement Engine 353 may readjust the bitmap's (X,Y) co-ordinates to push the bitmap to the center of the viewport. It may then, in embodiments, generate an interrupt for CPU 325.

However, if the bitmap is within the viewport, then Enforcement Engine 353 may compose the bitmap with the rest of the desktop. In embodiments, Enforcement Engine 353 may encrypt the composed desktop to an HDCP service 327 running inside TEE 320. HDCP service 327 may decrypt the composed bitmap, encrypt it with an appropriate HDCP key for a designated wireless display 370 and send it to the display panel. Finally, in embodiments, it may write an HMAC of the bitmap, along with the shared key, to a host readable register and send an interrupt to CPU 327 confirming that the bitmap was displayed to the user. In embodiments secure application 310 may read the HMAC, verify the HMAC, and be assured that the bitmap was actually displayed to the user.

To summarize, with reference to FIG. 3, in embodiments, the following process flow may occur, as shown: (1) Secure portion of Application 310 running on CPU 325 sends viewport and display ID number from within TEE 320 of CPU 325 to Enforcement Engine 353 over path 321 via Trusted Interface 355 of Enforcement Engine 353; (2) Unsecure portion of Application 310 sends an encrypted bitmap 371 to Enforcement Engine 353 from within UEE 315 of CPU 325, over untrusted channel 327 via Untrusted Interface 357 of Enforcement Engine 353; (3) Enforcement Engine 353 verifies, as shown at 323, that the bitmap received in (2) above is inside the viewport; (4) Enforcement Engine 353 encrypts the bitmap and writes it to memory at 361. Memory may include, for example, DRAM 365; (5) HDCP service 327 running inside TEE 320 reads the display ID number and encrypts it with an appropriate display key; (6) HDCP service 327 sends the transaction bitmap to the appropriate display.

In embodiments, a secure bitmap display mechanism may be also be used to securely assign display IDs to one or more displays. In such embodiments, a user may be shown a secure bitmap comprising, for example, one of numerals "1", "2", or "3" on each of several (e.g., three) different displays, and the user may be requested to acknowledge the display IDs. In embodiments, these display IDs may then be used by a secure application to direct an example transaction bitmap to the appropriate monitor. It is noted that whether the secure bitmap is shown on display 1, 2, 3 . . . or N, for example, is an out of band system configuration, generally not controlled by a user. However, in embodiments, a user may, in fact, control the actual ID number assigned to each display. Thus, for example, if a given CPU, such as CPU 225 in the example system depicted in FIG. 2, or, for example, CPU 325 in the example system depicted in FIG. 3, is connected to three displays A, B, C, and the system is configured to show the secure bitmap on display #1, the user may assign the number 1 to any display out of the three displays A, B and C.

Alternatively, it is noted, an example system may be configured to display a transaction bitmap on all displays. In such cases, numbering of the displays is irrelevant. This configuration may generally be decided by the secure application provider.

Figure 4:
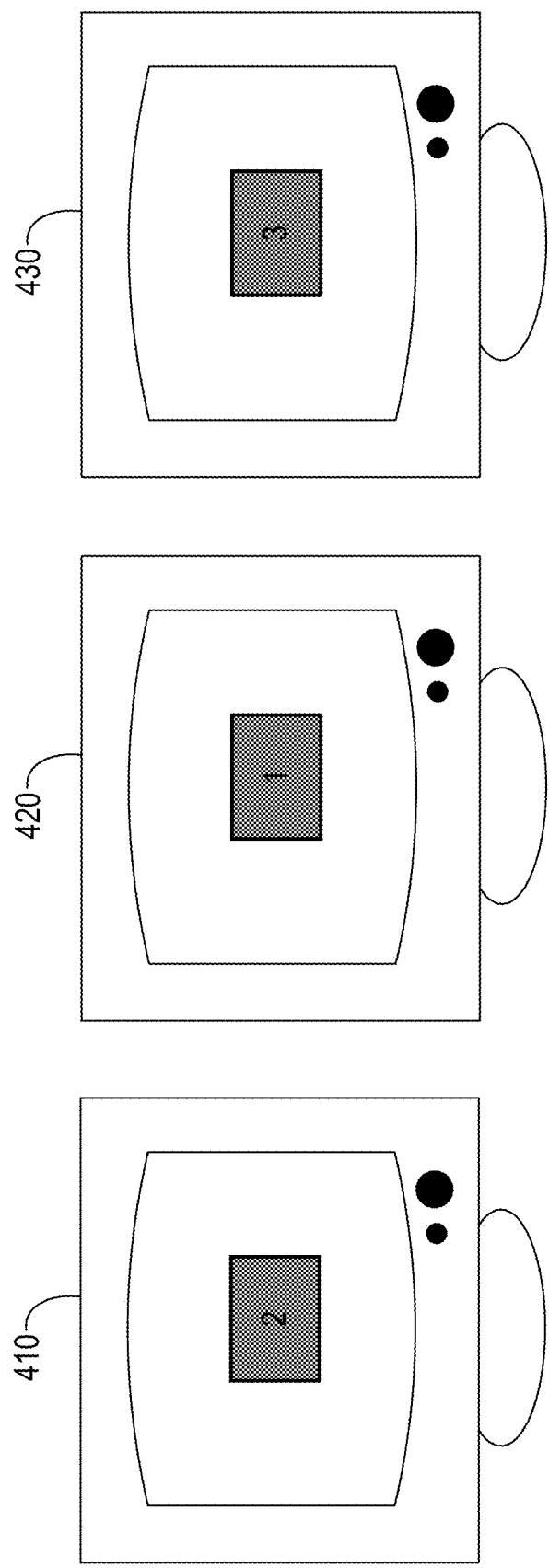
FIG. 4 illustrates a set of displays displayed to a user for acknowledgment, each display also including a display identifier (ID), in accordance with various embodiments.

Illustrating the embodiments described above, FIG. 4 illustrates a set of displays displayed to a user for acknowledgment, each display also including a display ID, in accordance with various embodiments. In embodiments, a display enumeration application may run inside either TEE 220 of FIG. 2, or TEE 320 of FIG. 3. In embodiments, the display enumeration application may display a secure bitmap with a display number to a user. In embodiments, a set of display ID numbers may be respectively displayed on corresponding displays using the secure bitmap mechanisms as described above. Thus, for example, as shown in FIG. 4, display 410 may be assigned No. 2 by the display enumeration application, display 420 may be assigned No. 1 by the display enumeration application, and finally, display 430 may be assigned No. 3 by the display enumeration application. In embodiments, a user would see display number bitmaps on each display bearing the proposed display number assignments, as shown in FIG. 4, for example.

In response, in embodiments, the user may acknowledge the display ID numbers proposed using an untrusted acknowledgement. It is here noted in this regard that because a malware or attacker cannot see the number that is assigned to and displayed on the display, due to its being sent as a secure bitmap from the TEE, the malware cannot know which number to acknowledge. Additionally, any such malware would only see a continuous stream of encrypted frames, so it would not know when the secure application offers a different proposed display ID to the user. In embodiments, as a result of this protocol, there may be an agreed upon set of display ID numbers between the user and the secure application running inside the TEE.

Figure 5:
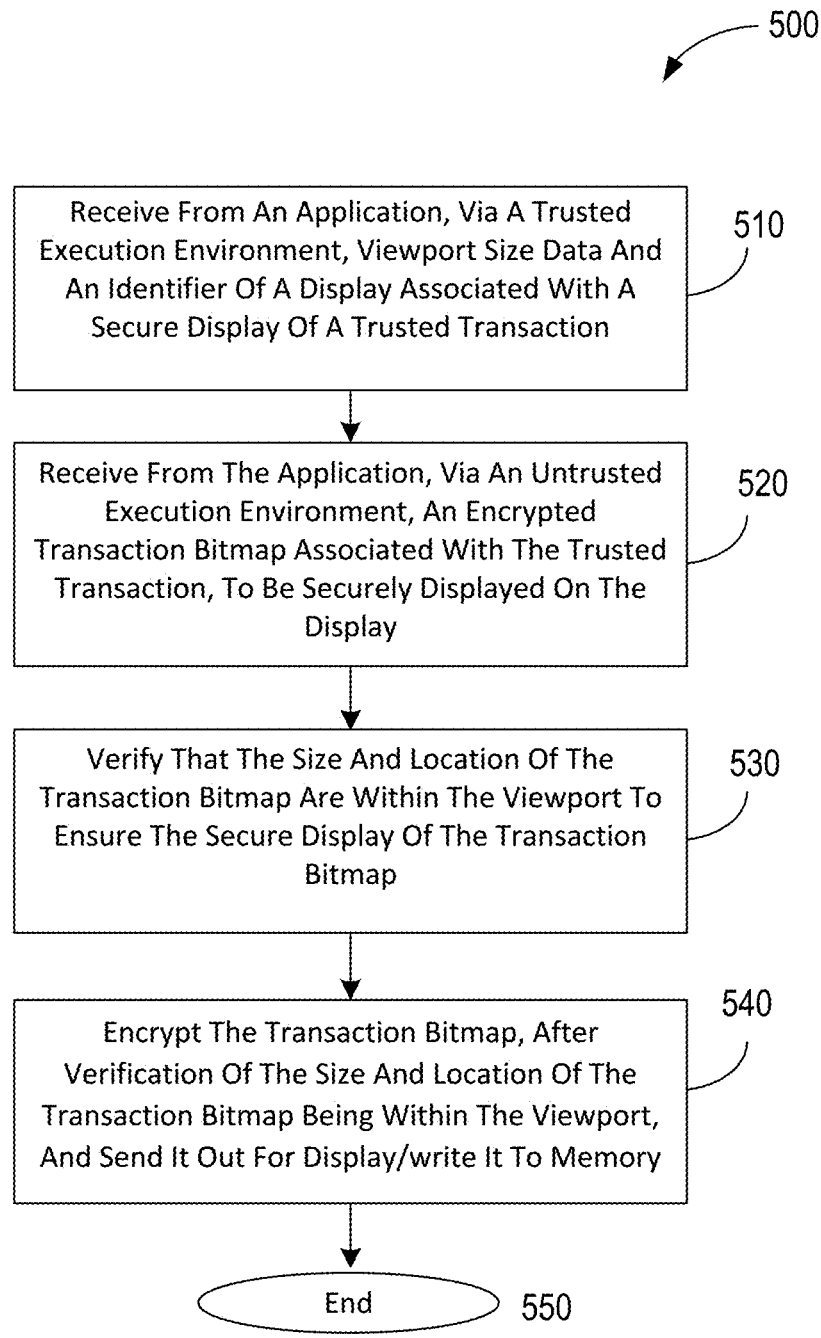
FIG. 5 illustrates an overview of the operational flow of an example process for enforcing secure display view for trusted transactions, in accordance with various embodiments.

Referring now to FIG. 5, an overview of the operational flow of an example process 500 for enforcing secure display view for trusted transactions, in accordance with various embodiments, is presented. Process 500 may be performed by apparatus such as Enforcement Engine 253 of the example apparatus depicted in FIG. 2, according to various embodiments, or, alternatively, it may be performed by apparatus such as Enforcement Engine 353 of the example apparatus depicted in FIG. 3, according to various alternate embodiments. Process 500 may include blocks 510 through 550. In alternate embodiments, process 500 may have more or less operations, and some of the operations may be performed in different order.

Process 500 may begin at block 510, where an example apparatus may receive, from an application, via a trusted execution environment, viewport size data and an identifier of a display associated with a secure display of a trusted transaction. From block 510, process 500 may proceed to block 520, where the example apparatus may receive from the application, via an untrusted execution environment, an encrypted transaction bitmap associated with the trusted transaction, to be securely displayed on the display. From block 520, process 500 may proceed to block 530, where the example apparatus may verify that the size and location of the transaction bitmap are within the viewport to ensure the secure display of the transaction bitmap. It is noted that, in embodiments, the verification of block 530 may be performed using Painter's algorithm.

From block 530, process 500 may proceed to block 540, where, after verification that the size and location of the transaction bitmap are in fact within the viewport, and thus no malware or attack has wrongfully changed the transaction bitmap, the example apparatus may encrypt the transaction bitmap, and send it out for display, in embodiments where the example process is performed by Enforcement Engine 253 of the example apparatus depicted in FIG. 2. However, in a slight variation, as discussed above in connection with FIG. 3, at block 540, after verification, the example apparatus may encrypt the transaction bitmap, and write it to memory. For example, it may write it to memory as shown by two-way arrow 361 of FIG. 3, into DRAM 365, also in FIG. 3.

Finally, from block 540, process 500 may proceed to block 550, where it may terminate.

Figure 6:
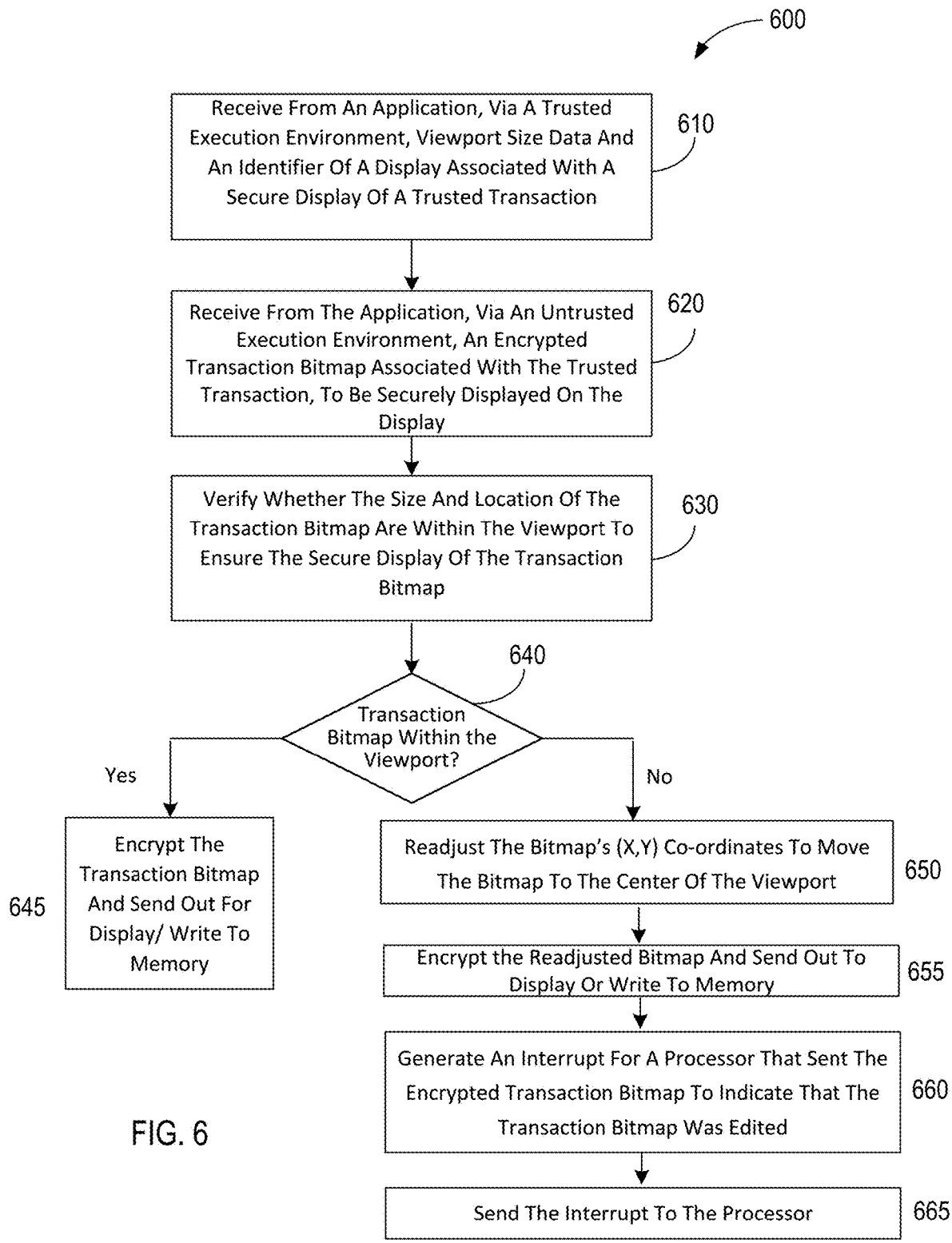
FIG. 6 illustrates an overview of the operational flow of an alternate example process for enforcing secure display view for trusted transactions, in accordance with various embodiments.

Referring now to FIG. 6, an overview of the operational flow of an alternate example process 600 for enforcing secure display view for trusted transactions, in accordance with various embodiments, is presented. Process 600 may be performed by apparatus such as Enforcement Engine 253 of the example apparatus depicted in FIG. 2, according to various embodiments, or, alternatively, it may be performed by apparatus such as Enforcement Engine 353 of the example apparatus depicted in FIG. 3, according to various alternate embodiments. Process 600 may include blocks 610 through 665. In alternate embodiments, process 600 may have more or less operations, and some of the operations may be performed in different order.

Process 600 may begin at block 610, where an example apparatus may receive, from an application, via a trusted execution environment, viewport size data and an identifier of a display associated with a secure display of a trusted transaction. From block 610, process 600 may proceed to block 620, where the example apparatus may receive from the application, via an untrusted execution environment, an encrypted transaction bitmap associated with the trusted transaction, to be securely displayed on the display. From block 620, process 600 may proceed to block 630, where the example apparatus may verify whether the size and location of the transaction bitmap are within the viewport to ensure the secure display of the transaction bitmap. It is noted that, in embodiments, the verification may be performed using Painter's algorithm.

From block 630, process 600 may proceed to query block 640, where it may be determined if the transaction bitmap is in fact within the viewport. If "Yes" at query block 640, then this is equivalent to the situation of the example process of FIG. 5, and process 600 may proceed to block 645, where the example apparatus may encrypt the transaction bitmap, and send it out for display, in embodiments where the example process is performed by Enforcement Engine 253 of the example apparatus depicted in FIG. 2, or, as noted above, may encrypt the transaction bitmap, and write it to memory. In embodiments where it is written to memory, such as, for example, when the example apparatus is provided in a graphics controller, the transaction bitmap may subsequently be read from the memory by HDCP Service 327, as shown in FIG. 3.

However, if "No" at query block 640, this means that there has likely been a malware attack, and remedial measures are required. Thus, process 600 may proceed to block 650, where the example apparatus may readjust the bitmap's (X,Y) co-ordinates to move the bitmap to the center of the viewport. From block 650, process 600 may proceed to block 655, where the example apparatus may encrypt the readjusted bitmap and, as described above, send it out for display in embodiments where the example process is performed by Enforcement Engine 253 of the example apparatus depicted in FIG. 2, or, may encrypt the readjusted transaction bitmap, and write it to memory. As also noted above, in embodiments where the readjusted bitmap is written to memory, such as, for example, when the example apparatus is provided in a graphics controller, the now readjusted transaction bitmap may subsequently be read from the memory by HDCP Service 327, as shown in FIG. 3.

From block 655, process 600 may proceed to block 660, where the example apparatus may alert the CPU, for example, CPU 225 as shown in FIG. 2, or, for example, CPU 325 as shown in FIG. 3, that there has been an attempt to change the transaction bitmap, and that remedial measures were taken, for example, readjustment of the transaction bitmap. Thus, at block 660 the example apparatus may generate an interrupt for a processor coupled to the apparatus that sent the encrypted transaction bitmap, the interrupt to indicate that the transaction bitmap was edited.

Finally, from block 660, process 600 may proceed to block 665, where the example apparatus may send the generated interrupt to the processor. At block 665, following sending of the interrupt, process 600 may terminate.

Figure 7:
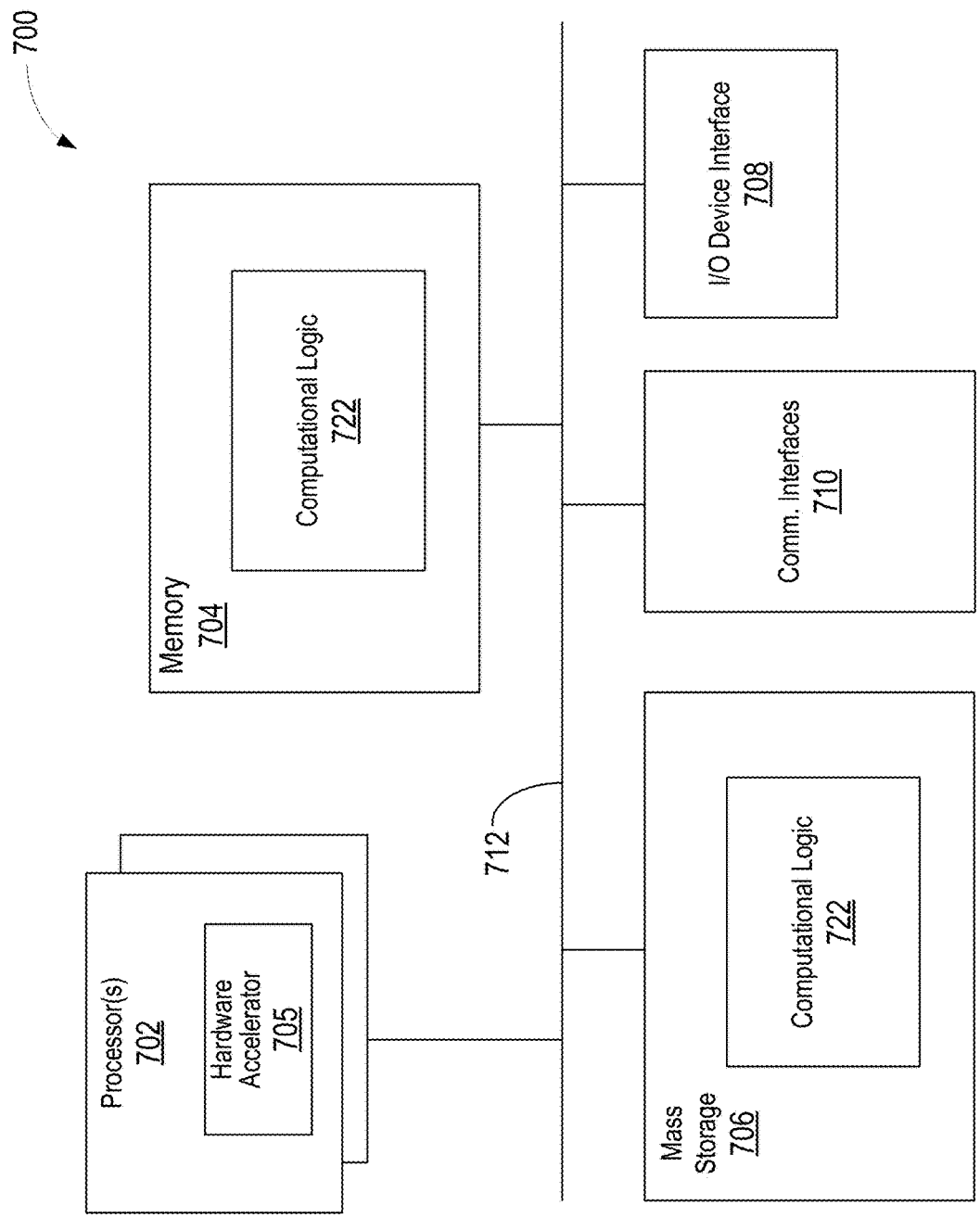
FIG. 7 illustrates a block diagram of an example computer device suitable for practicing the present disclosure, in accordance with various embodiments.

Referring now to FIG. 7 wherein a block diagram of a computer device suitable for practicing the present disclosure, in accordance with various embodiments, is illustrated. As shown, computer device 700 may include one or more processors 702, memory controller 703, and system memory 704. Each processor 702 may include one or more processor cores, and hardware accelerator 705. An example of hardware accelerator 705 may include, but is not limited to, programmed field programmable gate arrays (FPGA). In embodiments, processor 702 may also include a memory controller (not shown). In embodiments, system memory 704 may include any known volatile or non-volatile memory.

Additionally, computer device 700 may include mass storage device(s) 706 (such as solid state drives), input/output device interface 708 (to interface with various input/output devices, such as, mouse, cursor control, display device (including touch sensitive screen), and so forth) and communication interfaces 710 (such as network interface cards, modems and so forth). In embodiments, communication interfaces 710 may support wired or wireless communication, including near field communication. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the executable code of the programming instructions of an operating system, one or more applications, and/or various software implemented components of Enforcement Engine 253, Display Controller 250, Trusted Interface 255, Untrusted Interface 257, Application 210, CPU 225, TEE 220, UEE 215, Enforcement Engine 353, Graphics Controller 350, Trusted Interface 355, Untrusted Interface 357, Application 310, CPU 325, TEE 320, UEE 315, and DRAM 365, collectively referred to as computing logic 722. The programming instructions implementing computing logic 722 may comprise assembler instructions supported by processor(s) 702 or high-level languages, such as, for example, C, that can be compiled into such instructions. In embodiments, some of computing logic may be implemented in hardware accelerator 705. In embodiments, part of computational logic 722, e.g., a portion of the computational logic 722 associated with the runtime environment of the compiler may be implemented in hardware accelerator 705.

The permanent copy of the executable code of the programming instructions or the bit streams for configuring hardware accelerator 705 may be placed into permanent mass storage device(s) 706 and/or hardware accelerator 705 in the factory, or in the field, through, for example, a distribution medium (not shown), such as a compact disc (CD), or through communication interface 710 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 710-712 may vary, depending on the intended use of example computer device 700, e.g., whether example computer device 700 is a smartphone, tablet, ultrabook, a laptop, a server, a set-top box, a game console, a camera, and so forth. The constitutions of these elements 710-712 are otherwise known, and accordingly will not be further described.

Figure 8:
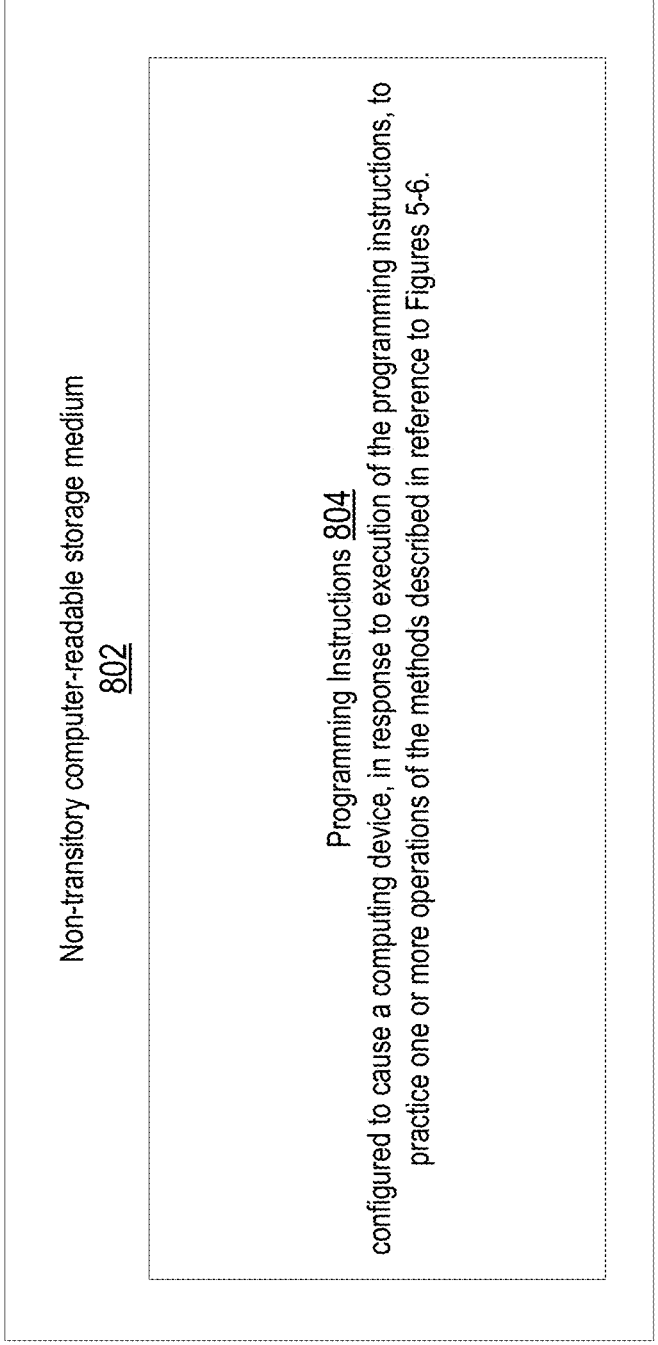
FIG. 8 illustrates an example computer-readable storage medium having instructions configured to practice aspects of the processes of FIGS. 4 and 5, in accordance with various embodiments.

FIG. 8 illustrates an example computer-readable storage medium having instructions configured to implement all (or portion of) software implementations of Enforcement Engine 253, Display Controller 250, Trusted Interface 255, Untrusted Interface 257, Application 210, CPU 225, TEE 220, UEE 215, Enforcement Engine 353, Graphics Controller 350, Trusted Interface 355, Untrusted Interface 357, Application 310, CPU 325, TEE 320, UEE 315, and DRAM 365, and/or practice (aspects of) processes 500 of FIG. 5, and 600 of FIG. 6, earlier described, in accordance with various embodiments. As illustrated, computer-readable storage medium 802 may include the executable code of a number of programming instructions or bit streams 804. Executable code of programming instructions (or bit streams) 804 may be configured to enable a device, e.g., computer device 700, in response to execution of the executable code/programming instructions (or operation of an encoded hardware accelerator 775), to perform (aspects of) process 500 of FIG. 5 and process 600 of FIG. 6. In alternate embodiments, executable code/programming instructions/bit streams 804 may be disposed on multiple non-transitory computer-readable storage medium 802 instead. In embodiments, computer-readable storage medium 802 may be non-transitory. In still other embodiments, executable code/programming instructions 804 may be encoded in transitory computer readable medium, such as signals.

Referring back to FIG. 7, for one embodiment, at least one of processors 702 may be packaged together with a computer-readable storage medium having some or all of computing logic 722 (in lieu of storing in system memory 704 and/or mass storage device 706) configured to practice all or selected ones of the operations earlier described with reference to FIGS. 5 and 6. For one embodiment, at least one of processors 702 may be packaged together with a computer-readable storage medium having some or all of computing logic 722 to form a System in Package (SiP). For one embodiment, at least one of processors 702 may be integrated on the same die with a computer-readable storage medium having some or all of computing logic 722. For one embodiment, at least one of processors 702 may be packaged together with a computer-readable storage medium having some or all of computing logic 722 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 may include an apparatus to enforce secure display view for trusted transactions, comprising: a first input interface to receive from an application, via a trusted execution environment, viewport size data and an identifier of a display associated with a secure display of a trusted transaction; a second input interface to receive from the application, via an untrusted execution environment, an encrypted transaction bitmap associated with the trusted transaction, to be securely displayed on the display; and an enforcement engine coupled to the first input interface and the second input interface, to verify the size and location of the transaction bitmap are within the viewport to ensure the secure display of the transaction bitmap, wherein the transaction bitmap is displayed, after verification of the size and location of the transaction bitmap being within the viewport.

Example 2 may include the apparatus of example 1, and/or any other example herein, wherein to verify the size and location of the transaction bitmap are within the viewport to ensure the secure display of the transaction bitmap, the enforcement engine is to: decrypt the transaction bitmap; and determine whether the size and location of the transaction bitmap are within the viewport.

Example 3 may include the apparatus of example 2, and/or any other example herein, wherein the enforcement engine, in response to a determination that the size and location of the transaction bitmap are within the viewport, is to further re-encrypt the transaction bitmap and send the encrypted transaction bitmap to the display.

Example 4 may include the apparatus of example 1, and/or any other example herein, wherein the trusted execution environment is associated with a processor that operates the application, and the first input interface is a secure interface, and is only accessible to the trusted execution environment of the processor.

Example 5 may include the apparatus of example 1, and/or any other example herein, wherein the untrusted execution environment is associated with a processor that operates the application, and the second input interface is a non-secure interface, and is accessible to the untrusted execution environment of the processor.

Example 6 may include the apparatus of example 1, and/or any other example herein, wherein the transaction bitmap includes a header that includes its (X,Y) co-ordinates, its size, and the identification of the display.

Example 7 may include the apparatus of example 1, and/or any other example herein, wherein to verify the size and location of the secure bitmap are within the viewport includes to compare a rectangle formed by the bitmap with the viewport.

Example 8 may include the apparatus of example 7, and/or any other example herein, wherein to compare the rectangle formed by the bitmap with the viewport includes to use, at least in part, Painter's algorithm.

Example 9 may include the apparatus of example 1, and/or any other example herein, wherein the enforcement engine, in response to a failure to verify that the size and location of the transaction bitmap are within the viewport, is to: readjust the bitmap's (X,Y) co-ordinates to move the bitmap to the center of the viewport; encrypt the readjusted bitmap; and generate an interrupt for a processor coupled to the apparatus that sent the encrypted transaction bitmap, the interrupt to indicate that the transaction bitmap was edited, and send the interrupt to the processor.

Example 10 may include the apparatus of example 2, and/or any other example herein, wherein the enforcement engine, in response to a determination that the size and location of the transaction bitmap are within the viewport, is to further re-encrypt the transaction bitmap and write the encrypted transaction bitmap to a memory.

Example 11 may include the apparatus of example 10, and/or any other example herein, wherein the encrypted transaction bitmap in the memory is to be read by a processor coupled to the apparatus that sent the encrypted transaction bitmap.

Example 12 may include the apparatus of example 11, and/or any other example herein, wherein the encrypted transaction bitmap in the memory is to be further decrypted by the processor and sent to the display.

Example 13 may include the apparatus of example 11, and/or any other example herein, wherein the encrypted transaction bitmap written to the memory includes a display identifier, the display identifier to be read by the processor, further encrypted by the processor with a display key, and sent, by the processor, with the transaction bitmap to the display.

Example 14 may include the apparatus of any one of examples 1-13, and/or any other example herein, wherein the apparatus is part of one of a display controller or a graphics controller.

Example 15 may include the apparatus of example 14, and/or any other example herein, wherein the encrypted transaction bitmap in the memory is to be read by a processor coupled to an apparatus that sent the encrypted transaction bitmap.

Example 16 may include the apparatus of example 14, and/or any other example herein, wherein the encrypted transaction bitmap in the memory is to be further decrypted by the processor and sent to the display.

Example 17 may include the apparatus of example 14, and/or any other example herein, wherein the encrypted transaction bitmap written to the memory includes a display identifier, the display identifier to be read by the processor, further encrypted by the processor with a display key, and sent, by the processor, with the transaction bitmap to the display.

Example 18 may include the apparatus of any one of examples 1-10, and/or any other example herein, wherein the apparatus is part of a display controller.

Example 19 may include the apparatus of any one of examples 11-17, and/or any other example herein, wherein the apparatus is part of a graphics controller.

Example 20 may include one or more non-transitory computer-readable storage media comprising a plurality of instructions that in response to being executed cause a computing device, to: receive from an application, via a trusted execution environment, viewport size data and an identifier of a display associated with a secure display of a trusted transaction; receive from the application, via an untrusted execution environment, an encrypted transaction bitmap associated with the trusted transaction, to be securely displayed on the display; verify the size and location of the transaction bitmap are within the viewport to ensure the secure display of the transaction bitmap; and send the transaction bitmap for display, after verification of the size and location of the transaction bitmap being within the viewport.

Example 21 may include the one or more non-transitory computer-readable storage media of example 20, and/or any other example herein, wherein to verify the size and location of the transaction bitmap are within the viewport to ensure the secure display of the transaction bitmap, includes to: decrypt the transaction bitmap; and determine whether the size and location of the transaction bitmap are within the viewport.

Example 22 may include the one or more non-transitory computer-readable storage media of example 20, and/or any other example herein, wherein the transaction bitmap includes a header that includes its (X,Y) co-ordinates, its size, and an identification of the display.

Example 23 may include the one or more non-transitory computer-readable storage media of example 20, and/or any other example herein, wherein to verify the size and location of the secure bitmap are within the viewport includes to compare a rectangle formed by the bitmap with the viewport.

Example 24 may include the one or more non-transitory computer-readable storage media of example 23, and/or any other example herein, wherein to compare the rectangle formed by the bitmap with the viewport includes to use, at least in part, Painter's algorithm.

Example 25 may include the one or more non-transitory computer-readable storage media of example 21, and/or any other example herein, further comprising instructions that, when executed, cause the computing device, in response to a failure to verify that the size and location of the transaction bitmap are within the viewport, to: readjust the bitmap's (X,Y) co-ordinates to move the bitmap to the center of the viewport; encrypt the readjusted bitmap; and generate an interrupt for a processor coupled to the apparatus that sent the encrypted transaction bitmap, the interrupt to indicate that the transaction bitmap was edited, and send the interrupt to the processor.

Example 26 may include the one or more non-transitory computer-readable storage media of example 25, and/or any other example herein, further comprising instructions that, when executed, cause the computing device to send the encrypted readjusted bitmap to a display.

Example 27 may include the one or more non-transitory computer-readable storage media of example 25, and/or any other example herein, further comprising instructions that, when executed, cause the computing device to write the encrypted readjusted transaction bitmap to a memory.

Example 28 may include the one or more non-transitory computer-readable storage media of example 27, and/or any other example herein, wherein the encrypted readjusted transaction bitmap in the memory is to be read by a processor running the application.

Example 29 may include the one or more non-transitory computer-readable storage media of example 28, and/or any other example herein, wherein the encrypted readjusted transaction bitmap in the memory is to be further decrypted by the processor and sent to the display.

Example 30 may include the one or more non-transitory computer-readable storage media of example 21, and/or any other example herein, further comprising instructions that, when executed, cause the computing device to, in response to a determination that the size and location of the transaction bitmap are within the viewport, re-encrypt the transaction bitmap and write the encrypted transaction bitmap to a memory.

Example 31 may include the one or more non-transitory computer-readable storage media of example 30, and/or any other example herein, wherein the encrypted transaction bitmap in the memory is to be read by a processor running the application.

Example 32 may include a method of enforcing secure display view for trusted transactions, comprising: receiving from an application, via a trusted execution environment, viewport size data and an identifier of a display associated with a secure display of a trusted transaction; receiving from the application, via an untrusted execution environment, an encrypted transaction bitmap associated with the trusted transaction, to be securely displayed on the display; verifying that the size and location of the transaction bitmap are within the viewport to ensure the secure display of the transaction bitmap; and in response to a verification that the size and location of the transaction bitmap are within the viewport, sending the transaction bitmap for display.

Example 33 may include the method of example 32, and/or any other example herein, wherein verifying that the size and location of the transaction bitmap are within the viewport to ensure the secure display of the transaction bitmap further comprises: decrypting the transaction bitmap; and determining whether the size and location of the transaction bitmap are within the viewport.

Example 34 may include the method of example 33, and/or any other example herein, further comprising, in response to a determination that the size and location of the transaction bitmap are within the viewport: re-encrypting the transaction bitmap; and sending the encrypted transaction bitmap to the display.

Example 35 may include the method of example 32, and/or any other example herein, wherein verifying that the size and location of the secure bitmap is within the viewport includes at least one of: comparing a rectangle formed by the bitmap with the viewport; or comparing a rectangle formed by the bitmap with the viewport, using, at least in part, Painter's algorithm.

Example 36 may include the method of example 32, and/or any other example herein, further comprising, in response to a failure to verify that the size and location of the transaction bitmap are within the viewport: readjusting the bitmap's (X,Y) co-ordinates to move the bitmap to the center of the viewport; encrypting the readjusted bitmap; generating an interrupt for a processor running the application, the interrupt to indicate that the transaction bitmap was edited; and sending the interrupt to the processor.

Example 37 may include the method of example 36, and/or any other example herein, further comprising writing the encrypted readjusted transaction bitmap to a memory.

Example 38 may include the method of example 37, and/or any other example herein, wherein the encrypted readjusted transaction bitmap in the memory is to be read by a processor running the application.

Example 39 may include the method of example 38, and/or any other example herein, wherein the encrypted readjusted transaction bitmap in the memory is to be further decrypted by the processor and sent to the display.

Example 40 may include the method of example 32, and/or any other example herein, wherein sending the transaction bitmap for display includes re-encrypting the transaction bitmap and writing the encrypted transaction bitmap to a memory.

Example 41 may include the method of example 40, and/or any other example herein, wherein the encrypted transaction bitmap in the memory is to be read by a processor running the application.

Example 42 may include one or more non-transitory computer-readable storage media comprising a plurality of instructions that in response to being executed cause a computing device to perform the method of any one of examples 32-41.

Example 43 may include an apparatus for computing, comprising: means for receiving from an application, via a trusted execution environment, viewport size data and an identifier of a display associated with a secure display of a trusted transaction; means for receiving from the application, via an untrusted execution environment, an encrypted transaction bitmap associated with the trusted transaction, to be securely displayed on the display; means for verifying that the size and location of the transaction bitmap are within the viewport to ensure the secure display of the transaction bitmap; and means for sending the transaction bitmap for display, after verifying the size and location of the transaction bitmap being within the viewport.

Example 44 may include the apparatus for computing of example 43, and/or any other example herein, wherein the means for verifying the size and location of the transaction bitmap are within the viewport to ensure the secure display of the transaction bitmap, includes: means for decrypting the transaction bitmap; and means for determining whether the size and location of the transaction bitmap are within the viewport.

Example 45 may include the apparatus for computing of example 43, and/or any other example herein, wherein the transaction bitmap includes a header that includes its (X,Y) co-ordinates, its size, and an identification of the display.

Example 46 may include the apparatus for computing of example 43, and/or any other example herein, wherein the means for verifying the size and location of the secure bitmap are within the viewport includes means for comparing a rectangle formed by the bitmap with the viewport.

Example 47 may include the apparatus for computing of example 46, and/or any other example herein, wherein the means for comparing the rectangle formed by the bitmap with the viewport uses, at least in part, Painter's algorithm.

Example 48 may include the apparatus for computing of either of examples 43 or 44, and/or any other example herein, further comprising, in response to the means for verifying failing to verify that the size and location of the transaction bitmap are within the viewport: means for readjusting the bitmap's (X,Y) co-ordinates to move the bitmap to the center of the viewport; means for encrypting the readjusted bitmap; and means for generating an interrupt for a processor running the application, the interrupt to indicate that the transaction bitmap was edited; and means for sending the interrupt to the processor.

Example 49 may include the apparatus for computing of example 48, and/or any other example herein, further comprising means for sending the encrypted readjusted bitmap to a display.

Example 50 may include the apparatus for computing of example 48, and/or any other example herein, further comprising means for writing the encrypted readjusted transaction bitmap to a memory.

Example 51 may include the apparatus for computing of example 50, and/or any other example herein, wherein the encrypted readjusted transaction bitmap in the memory is to be read by a processor running the application.

Example 52 may include the apparatus for computing of example 51, and/or any other example herein, wherein the encrypted readjusted transaction bitmap in the memory is to be further decrypted by the processor and sent to the display.

Example 53 may include the apparatus for computing of example 44, and/or any other example herein, further comprising, in response to the means for verifying determining that the size and location of the transaction bitmap are within the viewport, means for re-encrypting the transaction bitmap and means for writing the encrypted transaction bitmap to a memory.

Example 54 may include the apparatus for computing of example 53, and/or any other example herein, wherein the encrypted transaction bitmap in the memory is to be read by a processor running the application.

What is claimed is:

1. An apparatus to enforce secure display view for trusted transactions, comprising:
an enforcement engine to verify a size and a location of a transaction bitmap of a trusted transaction are within a viewport to ensure secure display of the transaction bitmap on a display device of a computing device hosting the display device and the apparatus;

wherein the enforcement engine includes:
a first trusted interface to receive from a trusted portion an application of the computing device, executing in a trusted execution environment of the computing device, viewport size data of the viewport and an identifier of the display device; and
a second untrusted interface to receive from an untrusted portion of the application, executing in an untrusted execution environment of the computing device, an encrypted version of the transaction bitmap associated with the trusted transaction, to be securely displayed on the display device; and
wherein the transaction bitmap is displayed, after verification of the size and the location of the transaction bitmap being within the viewport.

2. The apparatus of claim 1, wherein to verify the size and the location of the transaction bitmap are within the viewport to ensure the secure display of the transaction bitmap, the enforcement engine is to:
decrypt the encrypted version of the transaction bitmap to recover the transaction bitmap; and
determine whether the size and the location of the transaction bitmap are within the viewport.

3. The apparatus of claim 2, wherein the enforcement engine, in response to a determination that the size and the location of the transaction bitmap are within the viewport, is to further re-encrypt the transaction bitmap and send the re-encrypted transaction bitmap to the display device.

4. The apparatus of claim 1, wherein the trusted execution environment is associated with a processor that operates the trusted portion of the application, and the first trusted interface is a secure interface, and is only accessible to the trusted execution environment of the processor.

5. The apparatus of claim 1, wherein the untrusted execution environment is associated with a processor that operates the untrusted portion of the application, and the second untrusted interface is a non-secure interface, and is accessible to the untrusted execution environment of the processor.

6. The apparatus of claim 1, wherein the transaction bitmap includes a header that includes its (X,Y) co-ordinates, its size, and the identification of the display device.

7. The apparatus of claim 1, wherein to verify the size and the location of the transaction bitmap are within the viewport includes to compare a rectangle formed by the transaction bitmap with the viewport.

8. The apparatus of claim 7, wherein to compare the rectangle formed by the transaction bitmap with the viewport includes to use, at least in part, Painter's algorithm.

9. The apparatus of claim 1, wherein the enforcement engine, in response to a failure to verify that the size and the location of the transaction bitmap are within the viewport, is to:
readjust the bitmap's (X,Y) co-ordinates to move the bitmap to the center of the viewport;
encrypt the readjusted bitmap; and
generate an interrupt for a processor of the computing device that operates the trusted execution environment, the interrupt indicating that the transaction bitmap was edited, and send the interrupt to the processor.

10. The apparatus of claim 2, wherein the enforcement engine, in response to a determination that the size and the location of the transaction bitmap are within the viewport, is to further re-encrypt the transaction bitmap and write the re-encrypted transaction bitmap to a memory.

11. The apparatus of claim 10, wherein the re-encrypted transaction bitmap in the memory is to be read by a processor of the computing device that operates the trusted execution environment.

12. The apparatus of claim 11, wherein the re-encrypted transaction bitmap in the memory is to be further decrypted by the processor and sent to the display device.

13. The apparatus of claim 11, wherein the re-encrypted transaction bitmap written to the memory includes a display identifier identifying the display device, the display identifier to be read by the processor, further encrypted by the processor with a display key, and sent, by the processor, with the transaction bitmap to the display device.

14. The apparatus of claim 1, wherein the apparatus is part of one of a display controller or a graphics controller.

15. One or more non-transitory computer-readable storage media comprising a plurality of instructions that in response to being executed by a display or graphics controller of a computing device, cause the display or graphics controller to operate an enforcement engine to:
receive, via a first trusted interface of the enforcement engine, from a trusted portion of an application, executing in a trusted execution environment of the computing device, viewport size data of a viewport and an identifier of a display device associated with a secure display of a transaction bitmap associated with a trusted transaction;
receive, via a second untrusted interface of the enforcement engine, from an untrusted portion of the application, executing in an untrusted execution environment of the computing device, an encrypted version of the transaction bitmap;
verify a size and a location of the transaction bitmap are within the viewport to ensure the secure display of the transaction bitmap; and
send the transaction bitmap for display on the display device, after verification of the size and the location of the transaction bitmap being within the viewport.

16. The one or more non-transitory computer-readable storage media of claim 15, wherein to verify a size and a location of the transaction bitmap are within the viewport to ensure the secure display of the transaction bitmap includes to:
decrypt the encrypted version of the transaction bitmap to recover the transaction bitmap; and
determine whether the size and the location of the transaction bitmap are within the viewport.

17. The one or more non-transitory computer-readable storage media of claim 15, wherein the transaction bitmap includes a header that includes its (X,Y) co-ordinates, its size, and an identification of the display device.

18. The one or more non-transitory computer-readable storage media of claim 15, wherein to verify the size and the location of the secure bitmap are within the viewport includes to compare a rectangle formed by the bitmap with the viewport.

19. The one or more non-transitory computer-readable storage media of claim 18, wherein to compare the rectangle formed by the bitmap with the viewport includes to use, at least in part, Painter's algorithm.

20. The one or more non-transitory computer-readable storage media of claim 16, in response to a failure to verify that the size and location of the transaction bitmap are within the viewport, the enforcement engine is to:
readjust the bitmap's (X,Y) co-ordinates to move the bitmap to the center of the viewport;
re-encrypt the readjusted bitmap; and generate an interrupt for a processor of the computing device that operates the trusted execution environment, the interrupt indicating that the transaction bitmap was edited, and send the interrupt to the processor.

21. A method of enforcing secure display view for trusted transactions, comprising:
- receiving, by an enforcement engine of a computing device, from a trusted portion of an application of the computing device, executing in a trusted execution environment of the computing device, via a first trusted interface of the enforcement engine, viewport size data of a viewport and an identifier of a display device of the computing device associated with a secure display of a transaction bitmap of a trusted transaction;
- receiving, by the enforcement engine, from an untrusted portion of the application, executing in an untrusted execution environment of the computing device, via an untrusted interface of the enforcement engine, an encrypted version of the transaction bitmap;
- verifying, by the enforcement engine, that a size and a location of the transaction bitmap are within the viewport to ensure the secure display of the transaction bitmap; and
- in response to a verification that the size and the location of the transaction bitmap are within the viewport, sending, by the enforcement engine, the transaction bitmap for display on the display device.

22. The method of claim 21, wherein verifying that a size and a location of the transaction bitmap are within the viewport comprises:
- decrypting the encrypted version of the transaction bitmap to recover the transaction bitmap; and
- determining whether the size and the location of the transaction bitmap are within the viewport.

23. The method of claim 22, further comprising, in response to a determination that the size and location of the transaction bitmap are within the viewport:
- re-encrypting the transaction bitmap; and
- sending the re-encrypted transaction bitmap to the display device.

24. The method of claim 21, wherein verifying that the size and location of the secure bitmap is within the viewport includes at least one of:
- comparing a rectangle formed by the bitmap with the viewport; or
- comparing a rectangle formed by the bitmap with the viewport, using, at least in part, Painter's algorithm.

25. The method of claim 21, further comprising, in response to a failure to verify that the size and location of the transaction bitmap are within the viewport:
- readjusting, by the enforcement engine, the bitmap's (X,Y) co-ordinates to move the bitmap to the center of the viewport;
- encrypting, by the enforcement engine, the readjusted bitmap; and
- generating, by the enforcement engine, an interrupt for a processor operating the trusted execution environment, the interrupt indicating that the transaction bitmap was edited, and sending, by the enforcement engine, the interrupt to the processor.

* * * * *